A. E. LINEBERG.
TROLLEY WHEEL OR SHEAVE.
APPLICATION FILED FEB. 26, 1913.
1,077,147.
Patented Oct. 28, 1913.
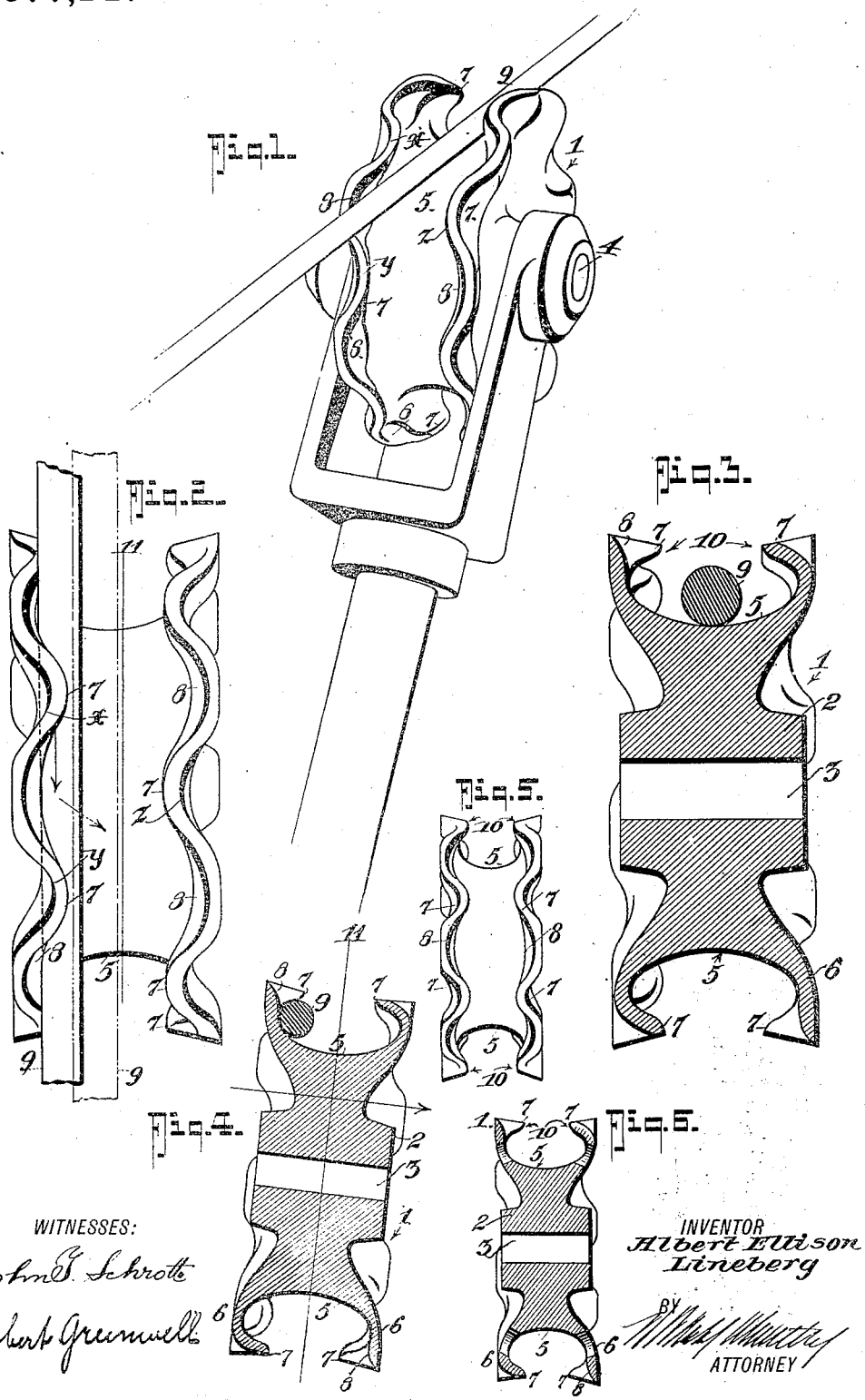
WITNESSES:
John T. Schrott
Robert Grunwell
INVENTOR
Albert Ellison Lineberg
BY
ATTORNEY

UNITED STATES PATENT OFFICE.

ALBERT ELLISON LINEBERG, OF WILKES-BARRE, PENNSYLVANIA.

TROLLEY WHEEL OR SHEAVE.

1,077,147.  Specification of Letters Patent.  Patented Oct. 28, 1913.

Application filed February 28, 1913. Serial No. 750,930.

*To all whom it may concern:*

Be it known that I, ALBERT ELLISON LINEBERG, a citizen of the United States, residing at Wilkes-Barre, in the county of Luzerne and State of Pennsylvania, have invented certain new and useful Improvements in Trolley Wheels or Sheaves, of which the following is a specification.

My invention relates to certain new and useful improvements in the construction of trolley wheels, sheaves, pulley wheels or the like, and in its generic nature the invention has for its object to provide an improved wheel or sheave of such construction that the wire or cable passing over the same will be maintained in operative relation or contact to the wheel regardless of lateral vibrations or movements that may occur in the wheel or wire themselves.

While my invention is of general application and I wish it understood that it may be employed wherever found desirable, I have nevertheless illustrated the invention as particularly adapted for use as a trolley wheel.

In the illustrative embodiment of the invention disclosed in the accompanying drawing, Figure 1 is a perspective view of the invention. Fig. 2 is a face view of the same. Fig. 3 is a vertical section of the wheel. Fig. 4 is a similar view illustrating the manner in which the wheel and wire are retained in operative contact. Fig. 5 is a view similar to Fig. 2 of a modified view showing the lugs opposed instead of staggered. Fig. 6 is a vertical section of the parts shown in Fig. 5.

In the drawing, 1 represents the wheel which is provided with the usual hub 2 of any approved construction, that is bored at 3 to receive the spindle 4 on which the wheel is mounted.

The inner surfaces of the wheel, at the sides 6 of the groove 5, are formed with undulated portions to provide alternately arranged lugs 7, and convexities 8, the number of which is so designed as to provide three lugs $x$, $y$ and $z$, continuously above the plane of the wire 9, whereby should the wire 9 work to one side or the other of the wheel, as indicated in full lines in Figs. 2 and 4, the lugs 7 will act as cams, as it were, or inclines to re-center the wire 9 in the wheel groove 5 by effecting a relative movement between the wire and the wheel.

When the wire 9 is relatively centered in the groove 5 and in the proper relative position, it will be perceived that the wire 9 will not come in contact with any of the lugs or projections 7 since the space or clearance between the opposing edges 10 of the lugs on opposite sides will be a greater magnitude than the diameter of the wire 9, thereby enabling freedom of turning of the wheel without undue frictional contact on the wire. When, however, the wire and the wheel move relatively laterally so that the wire 9 moves relatively to one side of the central plane 11 of the wheel, see Figs. 2 and 4, the lugs or projections 7 will come into operation to apply the required pressure or friction against the wire to cause a relative motion to occur between the wire and the wheel in an opposite direction to restore the parts to their normal positions indicated in Fig. 3.

Numerous variations in the design, form, or curvature of the lugs 7 may be employed to meet the exigencies of the particular case, and I do not wish to be limited to the precise design disclosed in the drawing, the gist of the invention residing in the provision of a series of projections from the opposing sides of the wheel flanges at the groove, so arranged that when the wire rides to one side or the other, such projections will operate to restore the wire to the mid-plane of the wheel.

From the foregoing description, taken in connection with the accompanying drawing, it is thought the complete construction, operation and advantages of the invention will be apparent to those skilled in the art to which the same relates.

What I claim is:—

1. In a wheel of the character stated, a body having an annular groove and side flanges, and a set of projections on each opposing face of said side flanges at the sides of the groove, the opposing edges of said projections being spaced apart a sufficient distance to permit entry of the wire into the groove.

2. A wheel of the character stated comprising a body portion having a spindle receiving bore, and including a peripheral groove to form side flanges, a set of alternately arranged projections and recesses on each side flange within the groove, said projections and recesses merging with each other to form undulated side walls for said groove, the adjacent edges of said projections being located above the plane of the wire and spaced apart a sufficient distance to permit entry of the wire into the groove.

3. A wheel of the character stated comprising a body having a hub portion to receive a spindle, and having a peripheral groove with side flanges, a set of projections projecting into said groove from said side flanges at the periphery thereof, the projections on one side flange being spaced from those on the other side flange a sufficient distance to permit entry of the wire into the groove, substantially as shown and described.

4. A wheel of the character stated comprising a body having a hub portion to receive a spindle, and having a peripheral groove with side flanges, a set of projections projecting into said groove from said side flanges at the periphery thereof, the projections on one side flange being spaced from those on the other side flange a sufficient distance to permit entry of the wire into the groove, the projections on one flange being staggered with relation to those on the other flange.

ALBERT ELLISON LINEBERG.

Witnesses:
 EUGENE K. FRY,
 CHAS. H. KLINGES.